United States Patent [19]

Powers

[11] Patent Number: 4,633,293

[45] Date of Patent: Dec. 30, 1986

[54] HIGH DEFINITION TELEVISION SIGNAL FOR FILM-TELEVISION STANDARDS CONVERSION SYSTEM

[75] Inventor: Kerns H. Powers, Princeton, N.J.

[73] Assignee: RCA Corporation, Princeton, N.J.

[21] Appl. No.: 639,662

[22] Filed: Aug. 13, 1984

[30] Foreign Application Priority Data

Sep. 26, 1983 [GB] United Kingdom ................ 8325689
Apr. 26, 1984 [GB] United Kingdom ................ 8410659

[51] Int. Cl.$^4$ .......................... H04N 11/20; H04N 7/01
[52] U.S. Cl. ........................................ 358/11; 358/140; 358/54; 358/214
[58] Field of Search ................... 358/11, 140, 54, 214, 358/216

[56] References Cited

U.S. PATENT DOCUMENTS

3,617,626 11/1971 Bluth ...................................... 178/5.4
4,449,143 5/1984 Dischert et al. ........................ 358/11

*Primary Examiner*—Michael A. Masinick
*Attorney, Agent, or Firm*—Eugene M. Whitacre; Paul J. Rasmussen; Joseph J. Laks

[57] ABSTRACT

A high definition television production system generates a high definition video signal that is easily convertible to signals formatted in accordance with other television and film standards of release media. Such other standards may include 525/60 and 625/50 formats and film formats having a frame rate of 24 film frames per second. The HDTV system employs vertical line scanning in the camera to generate the HDTV signal. The horizontal field scanning rate is chosen to be the lowest common integral multiple of the frame rates of the release standards of interest. The interlace factor is selected high enough to provide good temporal sampling and to result in a vertical line scanning frequency that yields an integral number of HDTV scan lines in the field or frame time of the release standards. The video sampling rate is selected to be compatible with the 13.5 megahertz digital world standard studio rate.

13 Claims, 16 Drawing Figures

TABLE OF LUMINANCE SIGNAL PARAMETERS

| | |
|---|---|
| ACTIVE IMAGE SAMPLE GRID | 756×1398 |
| ASPECT RATIO | 1.85 |
| SCANNING DIRECTION | VERTICAL |
| TOTAL NUMBER SAMPLES/LINE | 900 |
| TOTAL NUMBER LINES/FRAME | 1500 |
| NUMBER LINES/FIELD | 100 |
| INTERLACE FACTOR | 15:1 |
| INTERLACE SEQUENCE | $[1+4(n-1)]$ MODULO 15 |
| FRAME RATE, $H_z$ | 40 |
| LINE RATE, $F_V$ | 60,000 |
| FIELD RATE, $F_H$ | 600 |
| SAMPLING RATE, MHz | 54 |
| ANALOG BANDWIDTH, MHz | 22.0 |

HDTV SYSTEM 70

HIGH DEFINITION TELEVISION SIGNAL FOR FILM-TELEVISION STANDARDS CONVERSION SYSTEM

This invention relates to high definition television signals and the generating and processing thereof.

In the early days of television, the majority of the programs aired were movies played through a telecine machine. The only live programming was newscaster shots in the studio, special variety shows, and an occasional sports feature aired live. The live programming was shot by television cameras operating on the 525-line, 60-field-per-second, 2:1 interlaced scanning NTSC standard (525/60) in the United States and a similar 625/50 CCIR standard in Europe. The 24-frame per second movies were converted in the United States in the telecine machines by the 3-2 pulldown technique. Three fields of a given frame of the film were scanned followed by two fields on the next successive frame. In Europe, the films were simply run faster, at 25 frames per second, and the 4-percent error in speed was tolerated, even though the sound channel pitch was increased by the same factor.

There was little thought of program interchangeability between the 525/60 and 625/50 areas of the world in any medium other than film until the advent of the communication satellite which provided world-wide distribution of program material in electronic form. Digital standards conversion equipments were then developed but these are costly and the converted signals display jerk artifacts from the frame rate conversions.

Presently, programs produced with the intention to distribute through multiple media are shot on film. A major drawback of producing on film is the long turn-around time during shooting and editing. Advantages, however, are higher definition and the existence of world-standard film formats.

A need thus exists for a common world-standard high definition television (HDTV) system for electronic production of programs and features. Such a system should have simple convertibility to film, to 525/60, and to 625/50 television standards with minimum loss of quality and minimal motion artifacts. Electronic production should be done at higher resolution (horizontally, vertically, and temporally) than any of the intended release media to maintain quality during the post-production (editing) processing.

Other desirable characteristics of a world-standard system are:
1. Nearly equal facility for conversion to 525/60, 625/50, and film.
2. Balanced vertical and horizontal resolution, for maximum flexibility in post-production.
3. Wide aspect ratio, such as 1.85, a U.S. standard for release prints on film.
4. Compatibility with the 13.5 megahertz world digital studio standard.

A difficult requirement to be satisfied is a temporal resolution (motion rate) sufficiently high to avoid temporal aliasing (strobing) yet not so high as to require an inordinate bandwidth for the electronic recording system.

Figure 1:
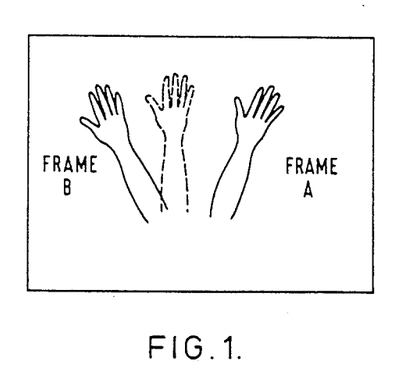
FIG. 1 illustrates interpolation of a scene between two frames to an intermediate frame.

The problem of temporal interpolation for frame rate conversion is illustrated in FIG. 1. When an object moves across the field of view, as, e.g., an arm with a hand, the object in two successive frames, Frame A and Frame B, appears in distinct positions as illustrated by the solid outlines. If one were to interpolate between frames to an intermediate frame at, say, 60 percent of the time differential, one would like to see the object at about 60 percent of the spatial distance between the objects in successive input frames, as illustrated by the dashed outline. No amount of amplitude interpolation between coincident pixels on two successive frames or on a small number of successive frames could be expected to yield an exact result, yet such is the manner by which today's frame-rate converters interpolate.

Of course, FIG. 1 is an exaggeration of the real case, as at normal temporal sampling rates in both film and television, the object will have moved a shorter distance between frames. Amplitude interpolation yields a smeared double (or multiple) image, a less severe effect than two sharp, distinct, widely separated images. In fact, to avoid or minimize the effect of strobing, i.e., when an object in sharp focus appears to jerk across the field of view through distinct positions, film cameramen make sure that the aperture of the lens is open for a sufficiently long fraction of the frame time so that the image smears as it exposes the film over its path. The blurred image gives the subjective effect of continuous rather than jerky motion, as the eye does not discern high resolution in moving objects. In television, strobing does not often occur because the frame is interlaced so that the effective motion rate is twice the frame rate, and in addition, many television camera pickup tubes have lag that smears the image over several fields of scan.

Higher degrees of interlace, e.g., 3:1, 4:1, and even 5:1 could improve the temporal sampling rate, but it is well known that higher-order interlace generates severe line-crawl effects when displayed to the viewer. On the other hand, a frame store may be incorporated in the display to reduce the line-crawl effects of interlace by refreshing all lines on the display progressively with each field.

Figure 2:
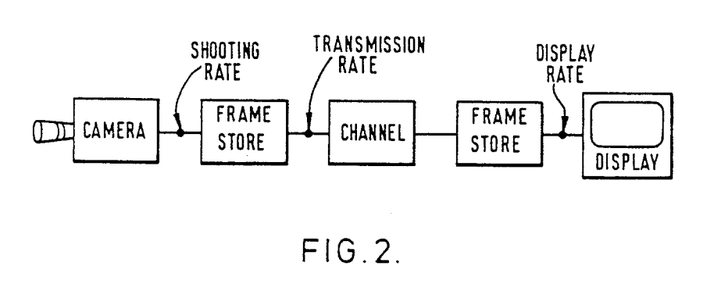
FIG. 2 illustrates a high definition television transmission system from camera end to display end.

This concept leads to the notion that the display rate and, indeed, the camera scanning rate (shooting rate) as well, may be separated from the transmission rate, as illustrated in FIG. 2. The information in the frame store at the camera end is updated at the shooting rate, whereas the transmitted signal may be chosen to be sent at a different, lower transmission rate, for example, to match the characteristics of the channel. Similarly, the display update rate may be substantially higher than the transmission rate to reduce such effects as large-area and interline flicker.

An inventive arrangement provides for a high definition television system that generates a video signal suitable for conversion to a first television format having $N_1$, e.g. 525, raster lines per frame and a frame rate of $F_1$, e.g. 30, frames per second, or to a second television format having $N_2$, e.g. 625, raster lines per frame and a frame rate of $F_2$, e.g. 25, frames per second, or to a third format for film that has a film frame rate of $F_3$, e.g. 24, frames per second. A device such as a camera produces a video signal representing a raster, wherein the video lines of the signal represent raster lines that are oriented perpedicular, e.g. vertical, to the orientation, e.g. horizontal, of the raster lines in the first or second television formats. Sync circuitry develops synchronizing signals for use by the device for generating the video lines at a video line rate that yields an integral number of video lines in the time duration of a frame of each of the first and second television formats and third, film format.

The video lines of the HDTV signal are arranged into fields having a field rate that is the lowest common multiple of the frame rates $F_1$, $F_2$ and $F_3$.

In accordance with an inventive feature, a temporal sampling rate equal to the lowest common multiple of the desired frame rates of various shooting media has the advantage that the frame store could be read out for each standard during frame or field blanking at the same time the camera signal is blanked. This implies the selection of a field rate that is the lowest common multiple of 24, 25, and 30, which is 600 field samples per second. Thus a system of 600 fields/second, interlaced 25:1, for example, could have a frame rate of 24/second and in addition would have an integral number of fields in 1/25 and 1/30 second. An advantage of such an inventive arrangement is that the video signal from such a system could be written to film directly without need for intermediate storage, although as will be discussed later, some temporal filtering might be desirable to achieve image blur.

In accordance with a different inventive feature, to minimize motion artifacts in the conversion to media having various other standards, the high-definition system may have a frame rate higher than that selected for the other standards to permit temporal prefiltering to be applied. A reasonable choice for such a rate is 40 frames per second. This frame rate is related to 24, 25, and 30 by the simple ratios 5/3, 8/5, and 4/3, respectively, and is also a submultiple of the 600 fields per second sample rate.

It will also be advantageous for the system to have a line frequency that will yield an integral number of HDTV scan lines in the time duration of each output field or frame of the release media. The value of 60,000 lines per second is unique in this respect yielding 2500, 2400, and 2000 scan lines in the durations 1/24, 1/25, and 1/30 of a second. In fact, 60,000 lines/sec gives 1001 lines in 1/59.94 of a second, the field duration of a 525/60 NTSC color television system.

Figure 3:
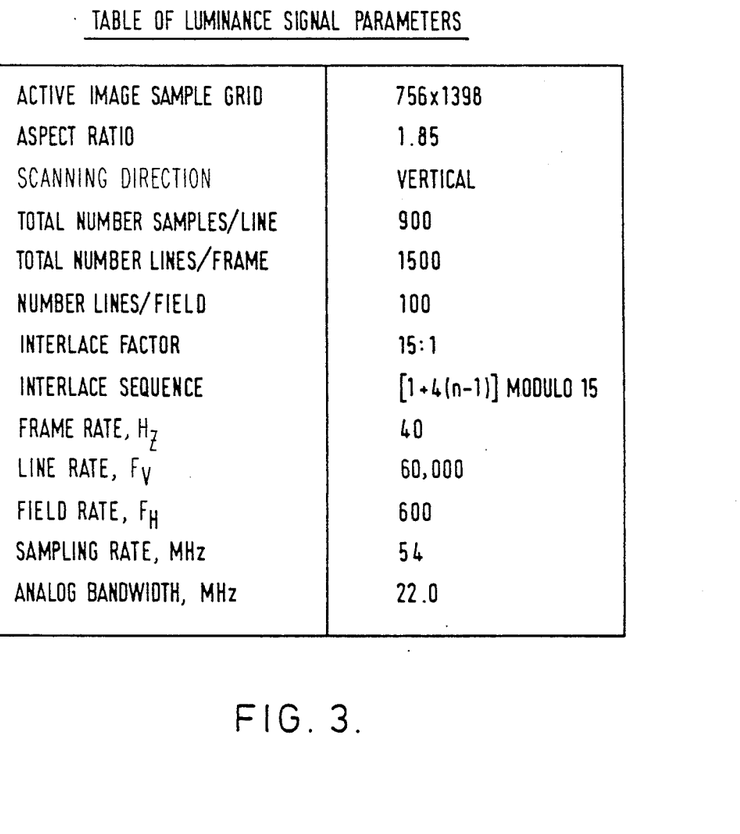
FIG. 3 illustrates a table of luminance signal parameters embodied by the inventive high definition television signal.

The system parameters listed in the Table of FIG. 3 are those of the luminance component of a digital HDTV system for electrocinematography, inventively embodying the desired characteristics already mentioned. In addition, by using a 54 megahertz sampling rate, for example, the digital system is compatible with the 13.5 megahertz digital studio standard, although its implementation in an analog format requires lower recording bandwidth (22 megahertz baseband).

In accordance with an inventive feature, vertical scanning is chosen so that the high frequency scanning is done in the smaller dimension of the wide aspect ratio to reduce the energy of electron beam deflection in the camera pickup tubes and displays, and to allow telecine reading of film to be orthogonal to laser-beam or electron-beam writing of the same film. As described in U.S. Pat. No. 4,449,143 of R. A. Dischert and K. H. Powers, entitled TRANSCODEABLE VERTICALLY SCANNED HIGH-DEFINITION TELEVISION SYSTEM, vertical scanning also simplifies conversion to 525- and 625-line horizontal scanning. The line-rate conversions are done by simply sampling the analog video signal at the appropriate rate to yield either 525 or 625 samples per vertical line. A vertical line blanking allocation of about 20 percent and a horizontal field blanking allocation of about 7 percent increase the 756 active samples/line to 900 and the 1398 active lines to 1500.

Figure 4:
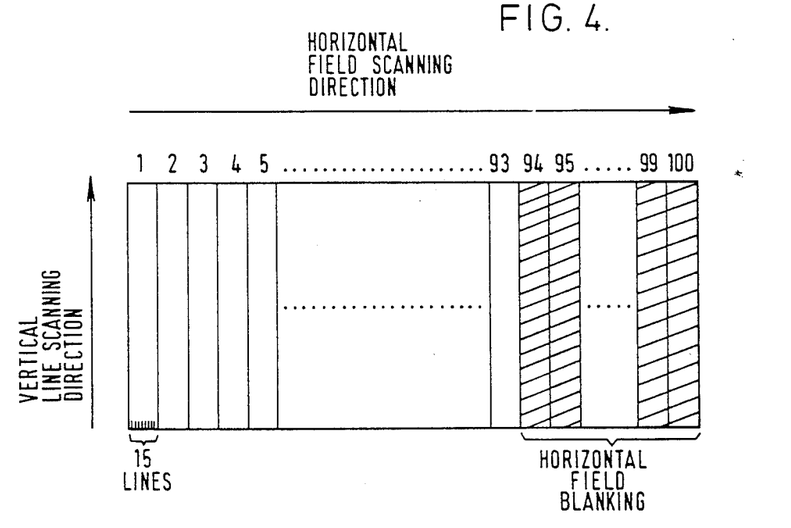
FIG. 4 illustrates schematically the interlaced vertical line scanning that produces the inventive high definition television signal.

FIG. 4 illustrates the scanning raster in which the 1500 vertical lines may be considered to be composed of 100 vertical segments, each containing 15 lines. The last seven segments (94–100) contain the horizontal blanking interval. The image is scanned left-to-right during each field by one line in each segment and 15 successive fields are required to scan every line in a segment.

If the lines in a given segment are scanned in successive fields, progressively from left to right, then an object moving right-to-left will be treated differently from a object moving left-to-right and motion artifacts could occur. For that reason, the lines in each successive field, in the example of FIG. 4, are hopped or skipped through the segment in a modulo pattern. That is, if we define the field in which the scan line is in the first position of any segment to be Field 1, then the next field, Field 2 will place a line at a position p lines to the right, where p is an integer having no common submultiple with 15. Continuing in this fashion, the nth field, Field n will place a line at position $[1+(n-1)p]$ modulo 15. For the case p=4, the position of the line in each successive field will be in the sequence 1, 5, 9, 13, 2, 6, 10, 14, 3, 7, 11, 15, 4, 8, 12 and then position 1 repeats.

Figure 5:
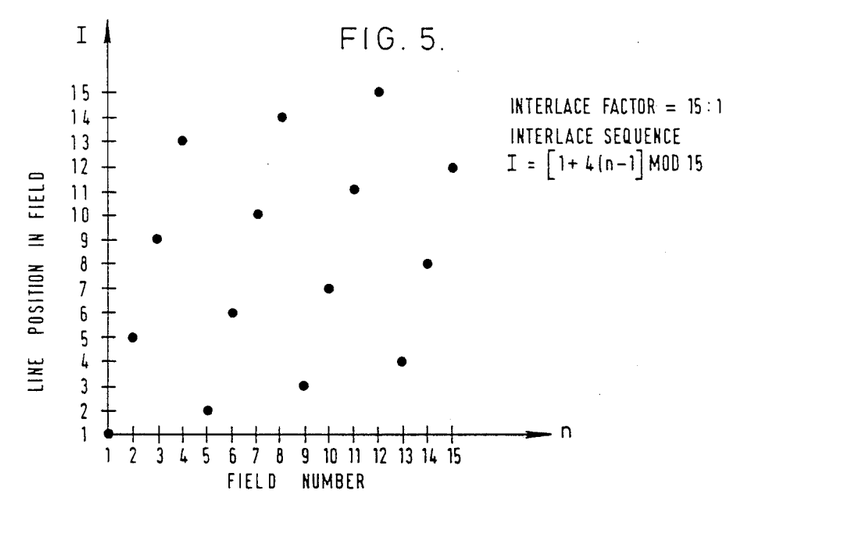
FIG. 5 illustrates the interlacing sequence used in generating the inventive high definition television signal.

Values of p other than 4 may be used but it is believed that the value 4 has an advantage, as illustrated in FIG. 5. FIG. 5 plots along the y-axis the line position (1–15) for a given field against field number (1–15) along the x-axis. FIG. 5 illustrates the line position for the modulo-hopping case p=4, which can be seen to place corresponding lines in adjacent fields 4 lines apart spatially. The field lines lie on a regular triangular grid in the number-position plane and every line position is equidistant from its six adjacent neighbors. It is believed that this pattern will make motion artifacts, if any, relatively isotropic in the image domain, that is, independent of the direction of motion.

So far the video signal scanning parameters of FIG. 3 have been discussed in general terms as they apply to the luminance component, with no reference being made to color or chrominance components. It is assumed that as part of a production standard, the color may be carried in the two color-difference components R-Y and B-Y, each occupying a base bandwidth about half that of the luminance Y component. Thus, the chrominance signals may be carried over a separate cable in a video signal similar to that of the luminance with the two color components time multiplexed in compressed form as shown in FIG. 6.

Figure 6:
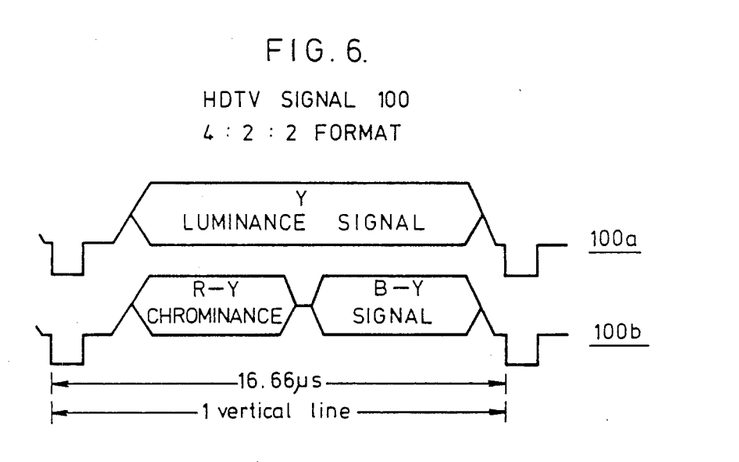
FIG. 6 schematically illustrates the luminance and chrominance signals of the inventive high definition television signal in a 4:2:2 time compressed format.

The R-Y and B-Y portions of chrominance signal 100b of HDTV signal 100, of FIG. 6, each occupies half the duration of the active luminance signal 100a, so that both the luminance and chrominance signals occupy equal basebandwidths and the previous discussion applies to both. Alternatively, the luminance and chrominance signals could be time multiplexed together on a single cable by either time-compressed analog multiplexing (TCAM) or, in the digital domain, by R-Y, Y, B-Y in sequence pixel-by-pixel in a 108 megasamples/second bit stream. In the case of TCAM, the basebandwidth would be 44 megahertz but the other parameters of FIG. 3 would apply to the demultiplexed Y, or to R, G, and B after demultiplexing and matrixing.

The discussion to follow will continue under the assumption that luminance and chrominance are processed separately.

The HDTV signal may be displayed directly on an R, G, B monitor configured to have deflection rates of 600 hertz horizontal field rate and 60 kilohertz vertical line rate. Even though each field contains only 100 lines there should be no visibility of a single field because of the eye (and phosphor) persistence. As the response time of the eye is in the order of 15-20 millisecond, 10-12 successive fields would be seen as one and 1000-1200 of the 1500 lines would be visible simultaneously at nearly the same brightness. Thus there should be no large area flicker. Some interline flicker at 40 hertz might be visible as each line is refreshed only after 25 millisecond. Objects in motion will be blurred, smeared, or possibly broken up on edges but motion should appear almost continuous because of the high temporal rate.

Figure 7:
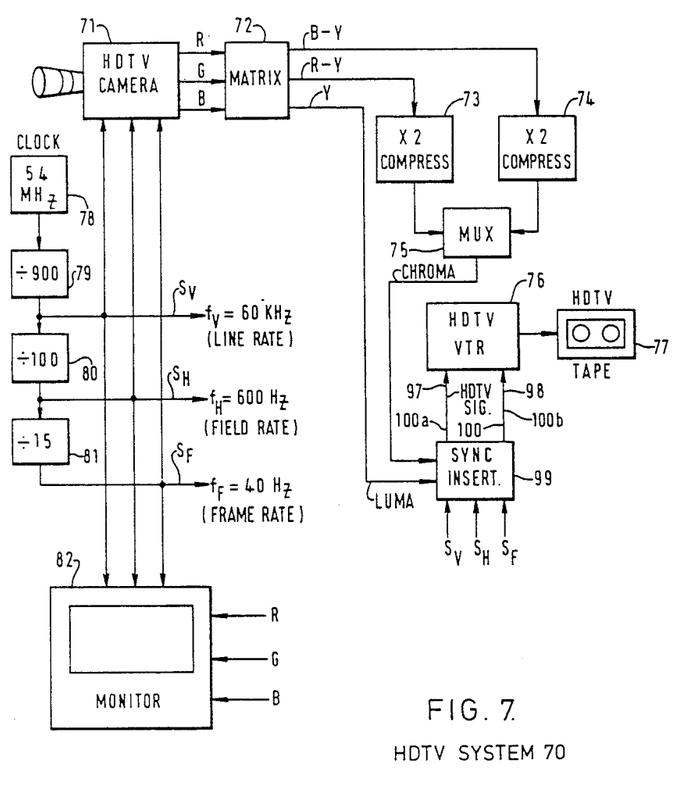
FIG. 7 illustrates a high definition television system embodying the invention.

FIG. 7 illustrates in block diagram form the production and display stages of an HDTV system 70 in accordance with an inventive aspect. A wide aspect ratio HDTV camera 71 is capable of providing high resolution R, G, B video signals by means of vertical line scanning of the image pickup elements in the camera. To provide the line, field, and frame synchronizing signals for the camera, a 54 megahertz clock 78 is divided in a divider 79 to generate the vertical line scanning synchronizing signal $S_V$ having a repetition rate of $f_V=60$ kilohertz. The output of divider 79 is further divided in a divider 80 to generate a horizontal field synchronizing signal $S_H$ having a repetition rate of $f_H=600$ hertz. The output of divider 80 is further divided in a divider 81 to generate a frame synchronizing signal $S_F$ having a repetition rate of $f_F=40$ hertz.

The vertical line, horizontal field and frame synchronizing signals $S_V$, $S_H$, $S_F$ are coupled to HDTV camera 71 to enable the camera to scan a raster in the manner just described and illustrated in FIG. 4, where the line scanning is in the vertical direction and the field scanning is in the horizontal direction. The frame sychronizing signal $S_F$ is used by the sync signal generating circuits in camera 71 in combination with the line and field synchronizing signals $S_V$ and $S_H$ to provide the proper interlace sequence illustrated in FIG. 5.

The high definition R, G, B signals developed by camera 71 are coupled to a matrix 72 to generate a luminance signal Y and chrominance signals R-Y, B-Y on separate signal lines. The R-Y, B-Y chrominance signals are time compressed by a time factor of two in time compression stages 73 and 74 and multiplexed onto a single signal line by a multiplexer 75. The chrominance signal from multiplexer 75 and the luminance signal from matrix signal 72 are coupled to a sync inserter 99 for the addition of synchronizing signal portions to the respective chrominance and luminance signals. The HDTV signal 100 illustrated in FIG. 6 is generated at the output of sync inserter 99, with the luminance signal 100a being developed on signal line 98 and the separate channel chrominance signal 100b being developed on signal line 98.

The HDTV signal 100 is coupled to a HDTV video tape recorder 76 to generate a production tape 77 of the program material shot by camera 71.

To monitor the television production as it is being shot, the R, G, B signals developed by camera 71, after being buffered by circuitry not shown in FIG. 7, are coupled to a high definition television montior 82 capable of receiving direct video inputs. Monitor 82, in addition to having a high resolution capability, is designed with deflection circuitry that generates line scanning in the vertical direction and field scanning in the horizontal direction. To synchronize the raster scanning on monitor 82, the line, field, and frame synchronizing signals $S_V$, $S_H$, $S_F$ are coupled to the sync circuitry of monitor 82.

Figure 8:
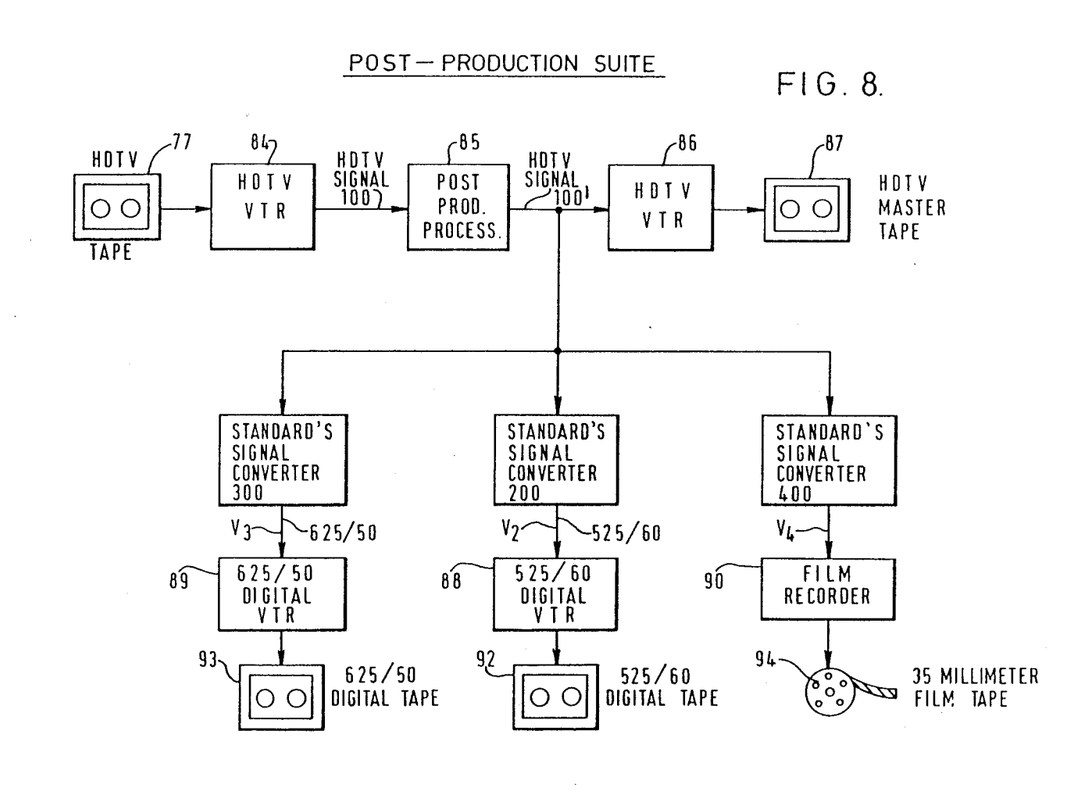
FIG. 8 illustrates a diagram of a post-production suite that processes the inventive high definition television signal, including the standard's conversion stage.

FIG. 8 illustrates a post-production suite or post-production processing flow of the program material generated by means of HDTV system 70 of FIG. 7. The production tape 77 generated by system 70 of FIG. 7 is played back by an HDTV video tape recorder 84 of FIG. 8 to regenerate HDTV signal 100. The information content of HDTV signal 100 is modified in a post-production processing stage 85 to provide captioning and graphics, special effects such as slow motion and split screen and other editing functions of like nature.

HDTV signal 100' with the modified information content generated in post-production processing stage 85 is coupled to an HDTV video tape recorder 86 for generating a master tape 87 used for distribution and archival purposes.

The program content of HDTV signal 100' may also be stored in various recording media such as video tape and 35 millimeter film tape in formats defined by other production standards. For example, the program material of HDTV signal 100' may be stored in a digital tape 92 in the 525/60 video format, or it may be stored in a digital tape 93 in a 625/50 CCIR video format, or it may be stored on a 35 millimeter film tape 94 in any one of several established formats that have, for example, a shooting rate of 24 film frames per second.

To accomplish the changing of formats from the format of HDTV signal 100' illustrated in FIG. 3, to each of the other formats used by recording media 92-94, HDTV signal 100' is coupled to respective standards signal converters 200, 300, 400 embodying inventive features. Standard's signal converter 200 changes HDTV signal 100' into a video signal $V_2$ having a standard 525/60 digital component format. Video signal $V_2$ is then recorded on digital tape 92 by a video tape recorder 88. Standard's signal converter 300 changes HDTV signal 100' into a video signal $V_3$ having a standard 625/50 digital component format. Video signal $V_3$ is then recorded on digital tape 93 by a video tape recorder 89. Standard's signal converter 400 changes HDTV signal 100' into a signal $V_4$ that is capable of being recorded on film tape 94 by a film recorder 90.

By proper selection of certain parameters of inventive HDTV signal 100', conversion to other production standards is greatly facilitated, enabling standard's signal converters 200 through 400 to be greatly simplified in design. For example, by employing vertical line scanning at the camera and by selecting the appropriate line and field scanning rates and interlace factors, frame rate conversion between the 40 frames per second of HDTV signal 100' and the frame rates of the other standards becomes a simple matter of sampling in the appropriate manner a frame store provided in the standard's signal converter. No temporal interpolation is necessary since the proper addressing sequence in the frame store inherently produces the time interpolation function.

As an example of appropriately selecting parameters for the production standard of HDTV signal 100 produced by the inventive arrangement of HDTV system 70 of FIG. 7, consider the table of luminance signal parameters of FIG. 3. Scanning is performed vertically at a rate of 100 lines per field, 600 fields per second, resulting in a vertical line scanning rate of $f_V = 60,000$ hertz. With an interlace factor of 15:1, the frame rate is 40 hertz. By choosing a sampling rate of 54 megahertz, a high resolution sampling of 900 total sample per vertical line is provided while permitting the sampling rate to be an integral multiple of the 13.5 megahertz world standard studio production sampling rate.

Note also that 600 fields per second is a integral multiple of each of the numbers 24, 25, 30, 40, 60 representing the frame and field rates existing and proposed for various film and television standards. Also note that the vertical scan rate of 60,000 hertz, when divided by the various field and frame rates of the various film and television standards, produces an integer number; e.g.
60,000/60 = 1,000,   60,000/59.94 = 1,001,
60,000/40 = 1,500,   60,000/30 = 2,000,
60,000/29.97 = 2,002,   60,000/25 = 2,400,
60,000/24 = 2,500. The relationships between these integer fractions are important factors in simplifying the design of the frame store circuitry associated with standard's signal converters 200 through 400 of FIG. 8.

In accordance with another inventive aspect, a standard's signal converter such as signal converter 200 of FIG. 8, converts HDTV signal 100' to, for example, a 525/60 television format in the world-standard digital component studio format. As part of the conversion, the spatial resolution of the image is reduced to avoid aliasing. Also conversion is made from vertical to horizontal scanning and the image is cropped to 4:3 aspect ratio.

Spatial filtering may be performed by up-sampling or interpolating to four times the desired spatial bandwidth, then 2:1 filtering the signal to ½ Nyquist frequency, then selecting alternate samples in the output. Frame rate conversion is done simply by reading the filtered signal into a frame store at the high temporal multiple-interlaced field rate and reading out the frame store at 2:1 interlace at the new frame rate. The frame store is loaded vertically and read out horizontally to convert the scanning direction. The process will be described for 525/60, although the same process is used for conversion to 625/50, except for the sampling clock rate and the number of samples per vertical line. The regenerated sync period is also slightly different for the two standards.

To end up with the 13.5 megahertz standard active image grid of 484 × 720 elements, begin with 1440 active elements horizontally and correct for the aspect ratio: 1440 × 1.85 ÷ 1.333 = 1998 active elements. Thus, one must upconvert the HDTV signal to 1998 active lines in the horizontal direction.

In the vertical direction, the HDTV analog signal is lowpassed filtered to convert the 756 active pixels into 484.

Figure 9:
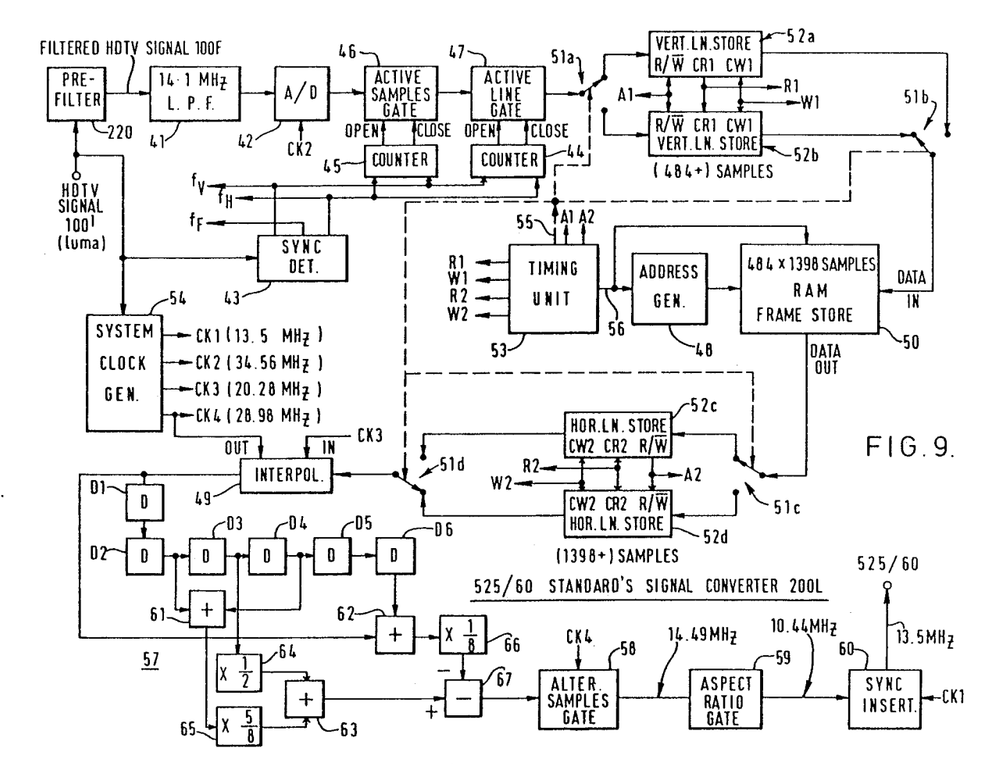
FIG. 9 illustrates an inventive embodiment of the 525/60 standard's signal converter of FIG. 8.

FIG. 9 illustrates a specific embodiment of the luminance signal processing section 200L of signal converter 200. A similarly designed section, not illustrated, processes the chrominance signal of HDTV signal 100'. In converter 200, the 22 megahertz bandwidth luminance HDTV signal is prefiltered in a filter 220 to blur the edge breakup that would otherwise appear on an individual frame caused by the multiple interlace effect on a moving edge in the image. The output of filter 220 is then low-pass filtered to 14.1 megahertz by a filter 41 to reduce the vertical resolution by the factor 484/756. The filtered signal is sampled and digitized in an analog-to-digital converter 41 that is clocked by a clock CK2 at, for example, 34.56 megahertz. The clock CK2 and all other clocks for signal converter 200 such as CK1, CK3 and CK4 are developed by a system clock generator 54 that is synchronized by video signal 100'.

The sync signals $f_V$, $f_H$ and $f_F$ are derived by a sync detector 43. Sync signal $f_V$ and $f_H$ are coupled to vertical and horizontal counters 44 and 45 respectively, to control gates 46 and 47 that will gate out 484 samples of each active line and the 1398 active lines of each frame. The 484 active samples are written into and subsequently time compressed by a pair of FIFO buffer stores 52a and 52b, functioning as vertical line stores. The samples are clocked and read out at a higher rate to permit approximately four vertical lines of processed HDTV signal 100' to be read vertically into a frame store 50 in approximately the same amount of time that a horizontal line of the 525/60 NTSC signal is read out of the frame store. Frame store 50 is loaded vertically by an address generator 48 in accordance with the [1+4 (n−1)] Modulo 15 algorithm to place adjacent vertical lines of the HDTV raster into adjacent positions or addresses in the frame store.

Each horizontal line that is read out out of frame store 50 is subsequently time expanded in a pair of FIFO buffers 52c and 52d, functioning as horizontal line stores. The samples are clocked and read out at a rate commensurate with the interlaced scanning of the 525/60 desired output. Note that frame store 50 contains the full horizontal resolution and aspect ratio of the HDTV system but needs store only 484 samples in the vertical dimension because of the reduced vertical resolution at that point in the signal processing. The 1398 samples of each active output line are read out and passed to an interpolating upsampler 49 to obtain the 1998 active samples in the horizontal direction. Interpolator 49 may be designed as a conventional multipoint interpolator or may be designed similar to the one described in U.S. patent application Ser. No. 484,527, filed Apr. 13, 1983, by K. H. Powers, entitled FOUR-SAMPLE SAMPLE-RATE CONVERTER.

A timing unit 53 generates the write clocks W1 and W2 and read clocks R1 and R2 that are coupled to the write terminals CW1 and CW2 and read terminals CR1 and CR2 of line stores 52a–52d. Timing unit 53 also generates the mode control signals A1 and A2 that are coupled to the R/$\overline{\text{W}}$ terminals of the line stores to switch the mode of operation of each line store between the read and write modes. Timing unit 53 generates switching signals along a signal line 55 that produces the necessary synchronized operation of switches 51a through 51d that enables 4 vertical lines of active samples that are gated through line gate 47 to be read into frame store 50 in about the same time that one horizontal line provided by frame store 50 is sent to interpolator 49.

The interpolated samples developed by interpolator 49 are coupled to a digital low-pass filter 57 which filters the samples to half the Nyquist frequency. Lowpass filter 57 comprises sample delay elements D1–D6, adders 61–63, multipliers 64–67 and a substractor 67. The digital LPF has a response characteristic that is complimentary to the high-pass filter response shown in FIG. 11 and to be discussed further.

The output of low-pass filter 57 now contains horizontal lines having 1998 active samples but is bandwidth reduced to the equivalent of 999 pixels resolution. Alternate samples from the output of filter 57 are removed in an alternate samples gate 58. A gate 59 crops the aspect ratio to 4:3 or further selects the center 720 samples out of the 999 to convert the aspect ratio from 1.85 to 1.33, to provide 720 active samples in the 525/60 output. An inserter stage 60 adds 138 samples of horizontal blanking and the vertical synchronizing signal portions of 20 to 21 lines per field. It should be noted that the clock rates CK2 through CK4 have been selected to produce an integer number of clock cycles within one vertical line period of HDTV signal 100′ or within one horizontal line period of the 525/60 digital television signal.

The output of sync inserter stage 60 is the luminance signal component of a digital component video signal with samples clocked at the 13.5 megahertz world standard rate. The separate chrominance signal of HDTV signal 100′, provided in the time compressed and multiplexed format illustrated in FIG. 6, is processed in the chrominance section of standard's signal converter 200 of FIG. 8. The chrominance section, not illustrated, is identical in design to the luminance section 200L of FIG. 9.

The output of converter 200 is recorded on a digital VTR for release in the standard 4:2:2, two channel, time multiplexed 525/60 format.

Figure 10:
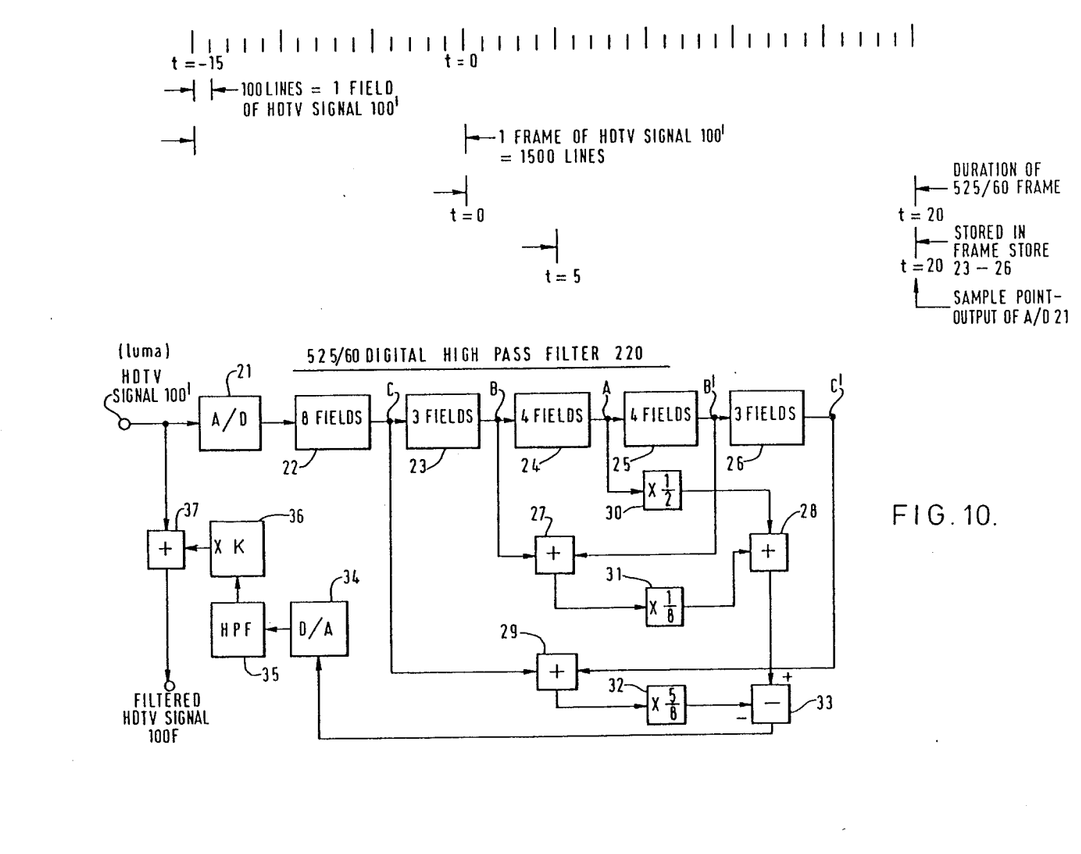
FIG. 10 illustrates an embodiment of the temporal prefilter of FIG. 9.

FIG. 10 illustrates a specific inventive embodiment of filter 220 of FIG. 9 for providing temporal filtering to blur the edge breakup that could otherwise appear on an individual frame. HDTV signal 100′ is converted to digital form in an analog-to-digital converter 21 that operates at a 54 megahertz sampling rate. The samples are stored in a memory having a capacity somewhat greater than a full frame. The memory is organized as field delays 22–26 in cascade. The signal at point A is delayed exactly one full frame (15 fields) from the input. The signal at point B or B′ is advanced or delayed, respectively, four fields from that at point A. In the modulo-hopped interlace with p=4, the signal four fields away, advanced or delayed, corresponds to the pixel 3 lines to the right or left, respectively, from the pixel at point A. Similarly, the signal at C or C′ is 7 fields away, advanced or delayed, from point A and correspond to the pixels on the immediately adjacent line, to the left or right, respectively, of point A.

Figure 11:
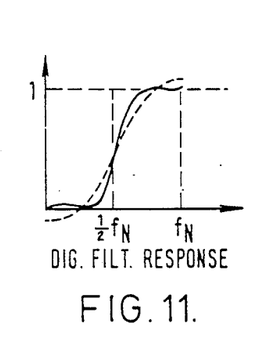
FIG. 11 illustrates the digital filter response of the digital filter of FIG. 10.

With the appropriate adders 27–29, multipliers 30–32 and substractor 33 coupled to signal points A, B, B′, C, C′, digital filter 220 of FIG. 10 constitutes a highpass filter in the horizontal spatial frequency domain having the response characteristic shown in FIG. 11. This is a conventional high pass digital filter passing frequencies above half the Nyquist frequency, or above ¼ the line frequency in the horizontal direction.

Figure 12:
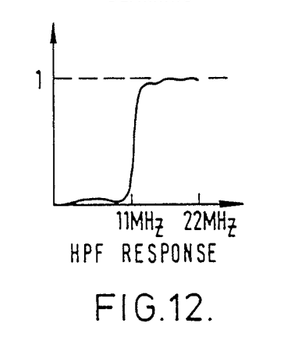
FIG. 12 illustrates the filter response of the analog high pass filter of FIG. 10.

The output of digital highpass filter 220 is converted to analog form in a digital-to-analog converter 34 and passed through an analog high pass filter 35 having the response shown in FIG. 12. This latter filter removes the low (vertical) spatial frequencies in the framedelayed image. After applying an appropriate multiplying factor K, in a multiplier 36, a part of the high spatial frequencies of the image from the previous frame are added to the image in the current frame in an adder 37. The output of adder 37 is filtered HDTV signal 100F.

Because of the time separation of the adjacent lines at C and C′ with respect to point A, the spatial frequency filtering also has a temporal filtering component. The low spatial frequencies are removed to avoid creating double images on the objects in motion. The result of the temporal filtering in FIG. 10 is to blur the edges of moving objects that tend to be broken up by the modulo interlace. The spatio-temporal filtering will have no effect on stationary portions of the image and the spatial resolution is not impaired except in high frequency motion regions.

FIG. 10 also illustrates timing aspects of the signal processing in filter 220. The sample point at t=20 is with respect to an arbitrary start point (t=0) occuring during the horizontal field blanking interval of the HDTV signal and represents the point in time when 2500 lines, or 25 fields of 100 lines each have been scanned in the camera (1/30 second after t=0).

Note that at the instant t=20 the frame store portion of the memory of filter 220, field delays 23–26, contains a full input frame of 1500 lines, representing the most recent information of 15 fields. By using filter 220 of FIG. 10 as a temporal prefilter in FIG. 9 prior to conversion of the HDTV signal to 525/60 format, there is avoided the wastfulness of otherwise discarding the first 10 fields stored in delay 22 of FIG. 10.

Figure 13:
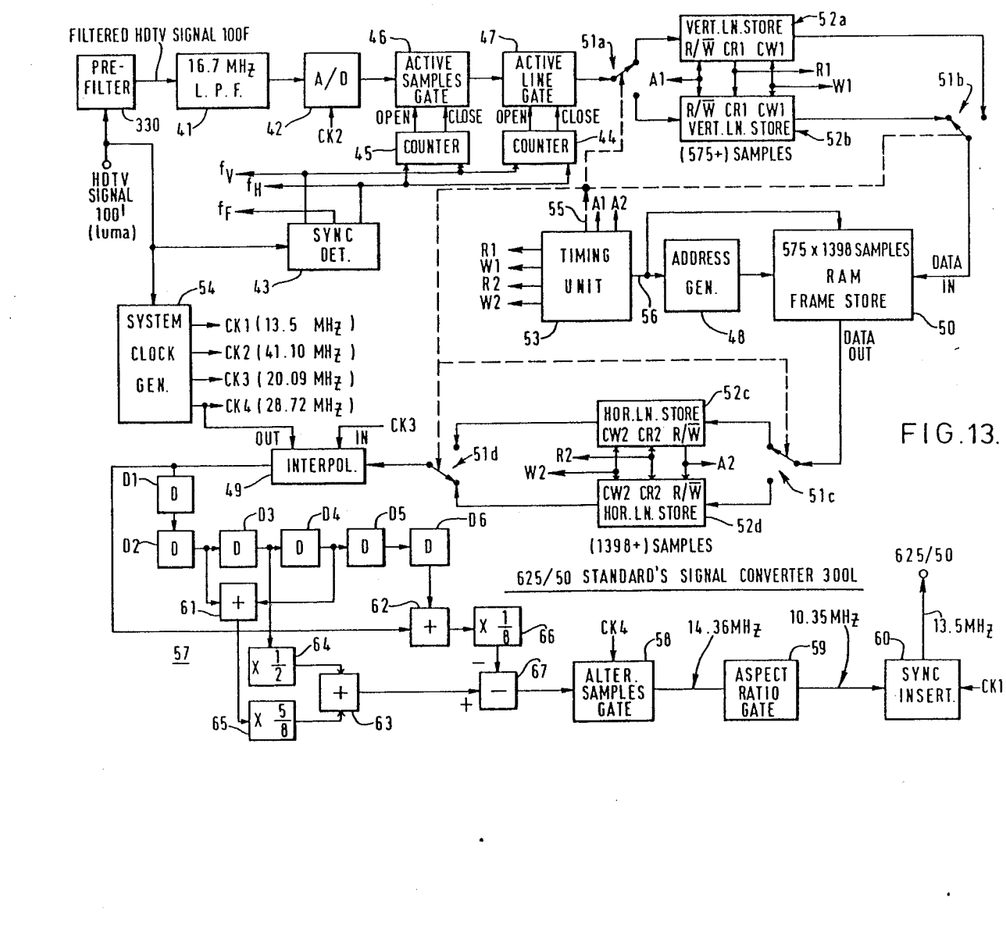
FIG. 13 illustrates an inventive embodiment of the 625/50 standard's signal converter of FIG. 8.

FIG. 13 illustrates a specific embodiment of the luminance processing section 300L of 625/50 CCIR standard's signal converter 300 of FIG. 8. The chrominance processing section, not illustrated, is similar in design to luminance processing section 300L. Converter 300 is similar to converter 200 of FIG. 9 except for timing synchronization and certain clock rates. Therefore, most of the items in FIGS. 9 and 13 are similarly identified as to function or parameter. As examples of differences between the two figures, note the following in FIG. 13: 575 active vertical pixels are stored in line stores 52a and 52b and in frame store 50, low-pass filter 41 cuts off at 16.7 megahertz, the clock rate CK2 for analog-to-digital converter 42 is 41.10 megahertz, the capacity of frame store 50 is 575×1398 samples, and the number of samples inserted by sync inserter 60 during horizontal line blanking is 144. The frame rate at the 13.5 megahertz studio standard sampling rate is 25 per second for 625/50 as compared with 29.97 for 525/60.

Figure 14:
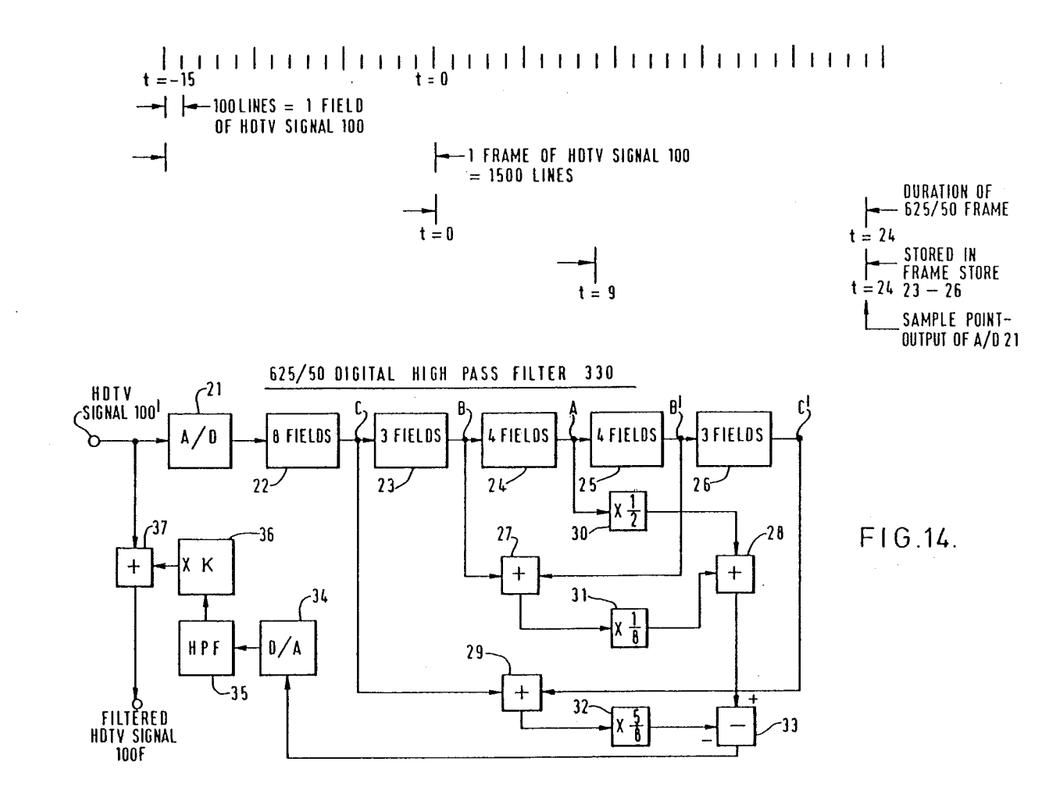
FIG. 14 illustrates an embodiment of the temporal prefilter of FIG. 13.

Digital high-pass filter 330 of FIG. 14 used as the temporal prefilter in FIG. 13 is identical in design to filter 220 of FIG. 10. The timing diagram portions of FIGS. 10 and 14 are similar except that the sample point in FIG. 14 occurs at time t=24 in FIG. 14 instead of at time t=20 in FIG. 10.

Figure 15:
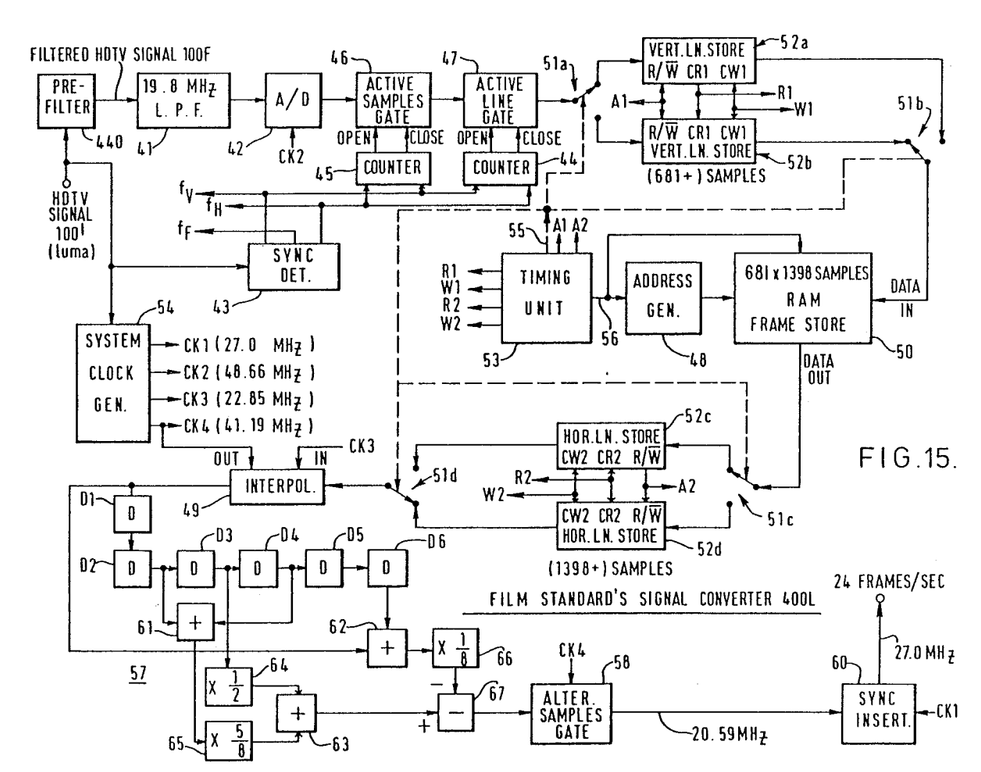
FIG. 15 illustrates an inventive embodiment of the film standard's converter of FIG. 8.

FIG. 15 illustrates a specific embodiment of film standard's signal converter 400 of FIG. 8. As an illustrative example, the film recorder 90 of FIG. 8 is assumed to be driven by a digital video signal $V_4$ from converter 400 with progressive (non-interlaced) scanning in a horizontal direction with 750 lines per frame at a frame rate of 24 per second. The line frequency of vide signal $V_4$ is thus 18 kilohertz. At a sample rate of 27 megahertz, this video signal provides 1500 samples per line and a horizontal bandwidth of 11 megahertz. Such a scanning system can provide an active image grid of 681×1260 pixels supporting an aspect ratio of 1.85 with equal horizontal and vertical resolution in cycles per picture height. Although it would be possible to record film with vertical scanning as in the HDTV signal 100', the frame rate would have to be converted from 40 to 24 frames/second and a converter similar in design to converters 200 and 300 can be used as a film standards signal converter, providing vertical-to-horizontal scan conversions as well. Most existing film recorders are designed for horizontal scanning.

As shown in FIG. 15, the RAM frame store 50 holds 681×1398 samples and has the same horizontal resolution as HDTV signal 100' although the vertical resolution has been reduced by the factor 681/756 in low-pass filter 41 to a video bandwidth of 19.8 megahertz. The interpolator 49 must now upconvert the 1398 samples from frame store 50 to 2520 (twice the 1260 horizontal active samples of the film scanning standard). These operations require clock CK3 and CK4 frequencies of 22.85 and 41.19 megahertz, respectively. Clock CK2 for analog-to-digital converter 42 is 48.66 megahertz and clock CK1 for the film standard's signal output from sync inserter 60 is 27 megahertz.

Figure 16:
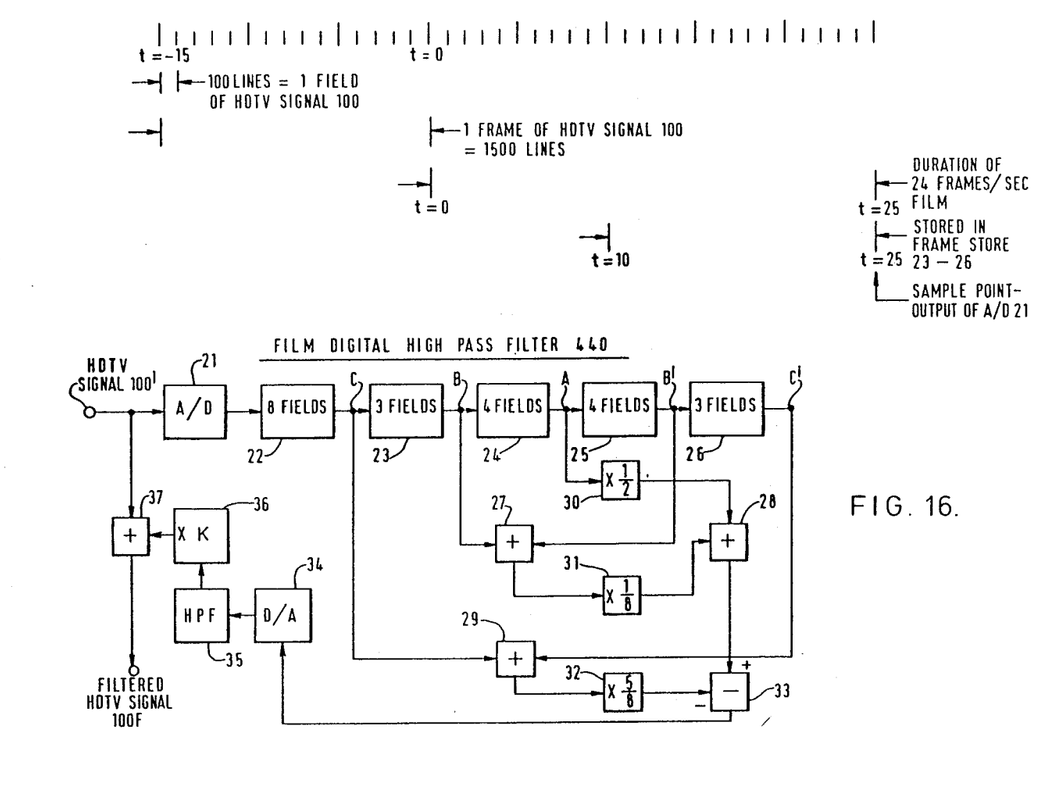
FIG. 16 illustrates an embodiment of the temporal prefilter of FIG. 15.

Digital high-pass filter 440 of FIG. 16 used as the temporal prefilter in FIG. 15 is identical in design to filter 220 of FIG. 10. The timing diagram portions of FIGS. 10 and 16 are similar except that the sample point in FIG. 16 occurs at time t=25 in FIG. 16 instead of at time t=20 in FIG. 10.

What is claimed is:

1. A high definition television system for generating a video signal suitable for conversion to a first television format having $N_1$ raster lines per frame and a frame rate of $F_1$ frames per second, to a second television format having $N_2$ raster lines per frame and a frame rate of $F_2$ frames per second, and to a third format for film that has a film frame rate of $F_3$ frames per second, where $N_1$, $N_2$, $F_1$, $F_2$, $F_3$ are positive numbers, said system comprising: first means for producing a video signal representing a raster, wherein the video lines of said signal represent raster lines that are oriented perpendicular to the orientation of the raster lines in said first or second television formats and including second means for developing synchronizing signals for use by said first means for generating said video lines at a video line rate that yields an integral number of said video lines in the time duration of a frame of each of the first and second television formats and of the third, film format and for arranging said video lines into fields having a field rate that is the lowest common multiple of the frame rates $F_1$, $F_2$ and $F_3$.

2. A television system according to claim 1 wherein for $F_1=25$, $F_2=30$ and $F_3=24$, said field rate is 600 fields per second.

3. A television system according to claim 1 wherein for $F_1=25$, $F_2=30$ and $F_3=24$, said video line rate is 60,000 lines per second.

4. A television system according to claim 1 wherein a frame of said video lines is generated by said first means at a frame rate higher than $F_1$, $F_2$ and $F_3$ and related thereto by simple ratios.

5. A television system according to claim 4 wherein for $F_1=25$, $F_2=30$ and $F_3=24$, said higher frame rate is 40 frames per second.

6. A television system according to claim 1 wherein considering said video lines generated by said first means as being divided into a plurality of segments each containing $N_3$ lines, where $N_3$ is a positive number, said lines are scanned successively one from each segment in each successive field with the positions of the successively scanned lines in their respective segments being progressively varied in a modulo pattern defined as $[1+(n-1)p]$ modulo $N_3$ where n is the field number and p is an integer having no common sub-multiple with $N_3$.

7. A television system according to claim 6 wherein $N_3=15$ and p=4.

8. A television system according to claim 1 including also, for converting said video signal to at least one of the three formats, a converter comprising:
means for storing line by line in one direction in an orthogonally organized store a frame of samples from said video signal, means for reading out the stored samples line by line in another orthogonal direction at a frame rate appropriate to said one format, and means for deriving from the read out samples successive fields of samples representing a desired active image grid for said one format.

9. A converter for converting the video signal generated by the high definition television system of claim 1 to at least one of the three formats, said converter comprising:
means for storing line by line in one direction in an orthogonally organized store a frame of samples from said video signal, means for reading out the stored samples line by line in another orthogonal direction at a frame rate appropriate to said one format, and means for deriving from the read out samples successive fields of samples representing a desired active image grid for said one format.

10. A high definition television system for generating a high definition video signal suitable for conversion to a first television format having $N_1$ raster lines per frame and a frame rate of $F_1$ frames per second, to a second television format having $N_2$ raster lines per frame and a frame rate of $F_2$ frames per second, and to a third format for film that has a film frame rate of $F_3$ frames per second, where $N_1$, $N_2$, $F_1$, $F_2$, $F_3$ are positive numbers, said system comprising: first means for scanning an image in a pattern of a raster to produce a video signal containing said image in the form of video lines associated with raster lines of said raster, and second means for developing synchronizing signals for use by said first means for generating said video lines at a video line rate that yields an integral number of said video lines during an interval substantially that of a frame period of each of the first and second televsion formats and of the third film format and for arranging said video lines into frames and fields thereof having a field rate that is the lowest common multiple of the frame rates $F_1$, $F_2$ and $F_3$.

11. A converter for converting a high definition video signal into any selected format, selected from a first television format having $N_1$ raster lines per frame and a frame rate of $F_1$ frames per second, a second television format having $N_2$ raster lines per frame and a frame rate of $F_2$ frames per second, and a third format for film that has a film frame rate of $F_3$ frames per second, where $N_1$, $N_2$, $F_1$, $F_2$, $F_3$ are positive numbers, said video signal including video lines generated at a video line rate that yields an integral number of said video lines during an interval substantially that of a frame period of each of the first and second television formats and of the third film format, said video lines being arranged into frames and fields thereof having a field rate that is the lowest common multiple of the frame rates $F_1$, $F_2$ and $F_3$, said converter comprising: means for storing line by line a frame of samples from said video signal, means for reading out the stored samples line by line at a line rate appropriate to said selected format, and means for deriving from the read out samples a plurality of samples representing a desired active image grid for said selected format.

12. A high definition television system for generating a high definition video signal suitable for conversion to a first television format having $N_1$ raster lines per frame and a frame rate of $F_1$ frames per second, to a second television format having $N_2$ raster lines per frame and a frame rate of $F_2$ frames per second, and to a third format for film that has a film frame rate of $F_3$ frames per second, where $N_1$, $F_1$, $F_2$, $F_3$ are positive numbers, said system comprising: first means for scanning an image in a line scanning direction and in a direction orthogonal to said line scanning direction in a pattern of a raster to produce a video signal containing said image in the form of video lines associated with raster lines of said raster, and second means including means for developing synchronizing signals for use by said first means for generating said video lines at a video line rate that yields an integral number of said video lines during an interval substantailly that of a frame period of each of the first and second television formats and of the third film format, wherein $N_3$ of said video lines are generated during an interval $T_3$, where $N_3$ is a positive number and where $T_3$ equals a scanning period in said orthogonal direction, and wherein the rate that said $N_3$ of said video lines are generated is the lowest common multiple of the frame rates $F_1$, $F_2$ and $F_3$.

13. A converter for converting the high definition video signal generated by the high definition television system of claim 12 to at least one of the three formats, said converter comprising: means for storing line by line a frame of samples from said video signal, means for reading out the stored samples line by line at a line rate appropriate to said one format, and means for deriving from the read out samples a plurality of samples representing a desired active image grid for said one format.

* * * * *